(Model.)

S. AYRES.
ANIMAL TRAP.

No. 282,482. Patented Aug. 7, 1883.

Witnesses:
Hilo Wann
Jas. Greene

Inventor:
Saml. Ayres,
by J. G. Arnold,
Attorney.

UNITED STATES PATENT OFFICE.

SAMUEL AYRES, OF WORCESTER, MASSACHUSETTS, ASSIGNOR TO S. AYRES & SON, OF SAME PLACE.

ANIMAL-TRAP.

SPECIFICATION forming part of Letters Patent No. 282,482, dated August 7, 1883.

Application filed March 2, 1883. (Model.)

*To all whom it may concern:*

Be it known that I, SAMUEL AYRES, of the city and county of Worcester, State of Massachusetts, have invented a new and useful Animal-Trap, of which the following is a specification.

My invention relates to that class of spring-traps that are set with bait, and is designed to not only catch the animal at the bait or near it, but after the trap is sprung to use that as a decoy for others without being reset. Its nature is fully shown in the following description and accompanying drawings of a trap embodying my invention.

Figure 1:
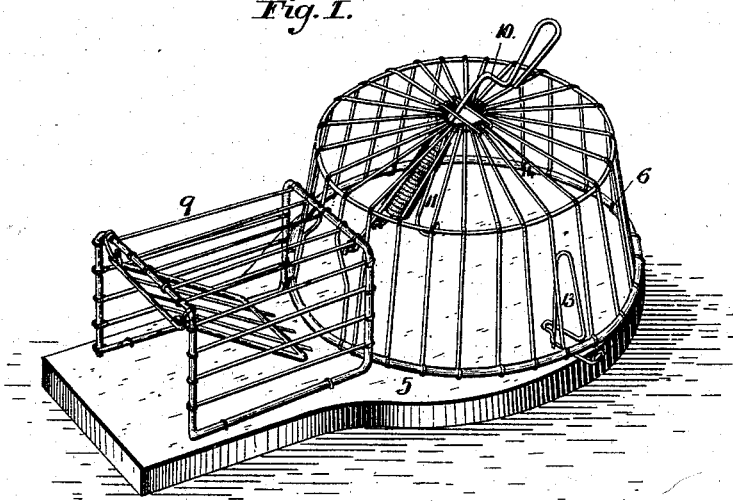
Figure 2:
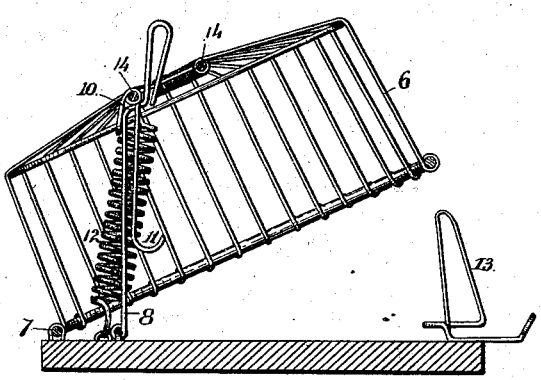

In said drawings, Figure 1 is a perspective view of the trap, and Fig. 2 is an end view of the same as set, the same figures indicating the same parts in each.

Many and various wire traps have been made with doors or openings to be closed by springs, &c. Mine differs from these in tipping or tilting up the body of the trap from its stationary base and passage-way attached thereto, the body having an opening fitting said passage-way when the trap is closed, so that any number can enter.

The base 5 (see drawings) I make of wood, and the cage 6 of wire, round in form and hinged on one side, 7, to the base 5, its top having a central ring, 14, with wires across, between which the setting-lever 8 can pass. At 9 is a stationary passage-way or entrance, fast to the base 5, and provided with a hinged gate of common form, which allows free entrance by lifting, and, falling, closes the way against the exit, the cage 6 being provided with an opening or part fitting, when down, the end of the passage-way 9. The lever 8 is hung to the base 5 by a staple at its bottom, and has a shoulder, 10, near the top, on which the central ring of cage 6 rests when the trap is set, as in Fig. 2. The bait-lever 11 swings on the same ring, and has a projecting end or bend to rest against the lever 8, its lower end receiving the bait. This lever is so arranged that a little motion of its lower end throws out the shoulder of the lever 8, letting the cage 6 fall, which fall is hastened by the spring 12. At 13 is a figure-4 spring, its lower end entering the base 5 and holding it in place, its sloping spring side arranged to be pressed back by the edge of the cage 6 in falling, so that when down it passes below the point, as shown in Fig. 1, the outer end of the wire of which the spring is made being turned up, or in some suitable form to press the spring in by, to release the rim of the cage in setting.

Having thus fully described my invention, what I claim therein as new, and desire to secure by Letters Patent, is—

In an animal-trap, the combination of the independent passage-way 9, fastened to the base, and the tilting cage 6, provided with an opening fitting the end of said passage-way when the trap is closed, substantially as above set forth and described.

SAMUEL AYRES.

Witnesses:
C. R. AYRES,
J. G. ARNOLD.